(12) United States Patent
Ma et al.

(10) Patent No.: US 8,112,763 B2
(45) Date of Patent: Feb. 7, 2012

(54) COMPUTER-IMPLEMENTED METHOD, APPARATUS, AND COMPUTER PROGRAM PRODUCT FOR TRANSMITTING INFORMATION BETWEEN CORBA APPLICATIONS AND SERVERS UTILIZING HTTP

(75) Inventors: Suhong Ma, Beijing (CN); David W. Wu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1582 days.

(21) Appl. No.: 11/289,717

(22) Filed: Nov. 29, 2005

(65) Prior Publication Data

US 2007/0124741 A1    May 31, 2007

(51) Int. Cl.
  G06F 3/00    (2006.01)
  G06F 9/44    (2006.01)
  G06F 9/46    (2006.01)
  G06F 13/00   (2006.01)
(52) U.S. Cl. ..................................................... 719/315
(58) Field of Classification Search ................... 719/315
  See application file for complete search history.

(56) References Cited

U.S. PATENT DOCUMENTS

| | | | |
|---|---|---|---|
| 6,591,306 B1 | 7/2003 | Redlich | 709/245 |
| 6,609,158 B1 | 8/2003 | Nevarez et al. | 709/316 |
| 7,028,312 B1 * | 4/2006 | Merrick et al. | 719/330 |
| 2002/0083191 A1 | 6/2002 | Ryuutou et al. | 709/237 |
| 2002/0099738 A1 * | 7/2002 | Grant | 707/513 |

OTHER PUBLICATIONS

Gokhale et al. "Reinventing the Wheel? CORBA vs. Web Services" Sep. 15, 2004 http://web.archive.org/web/20040915082139/http://www2002.org/CD . . . pp. 1-22. retrieved Aug. 6, 2010.*

* cited by examiner

*Primary Examiner* — Andy Ho
*Assistant Examiner* — Timothy A Mudrick
(74) *Attorney, Agent, or Firm* — Yee & Associates, P.C.; Prentiss W. Johnson

(57) ABSTRACT

A computer-implemented method, apparatus, and computer program product in a data processing environment for transmitting information between a CORBA application executing within a client and a server utilizing HTTP are disclosed. An application that is being executed by a client requests a CORBA IDL stub to invoke a method. The CORBA IDL stub transmits requests to a server utilizing Internet Inter-ORB Protocol (IIOP). An HTTP stub is generated that transmits requests utilizing HTTP. The HTTP stub corresponds to the CORBA IDL stub such that the CORBA IDL stub and the HTTP stub define the same methods. The HTTP stub transmits the request of the CORBA IDL stub to invoke the method to the server utilizing HTTP.

14 Claims, 6 Drawing Sheets

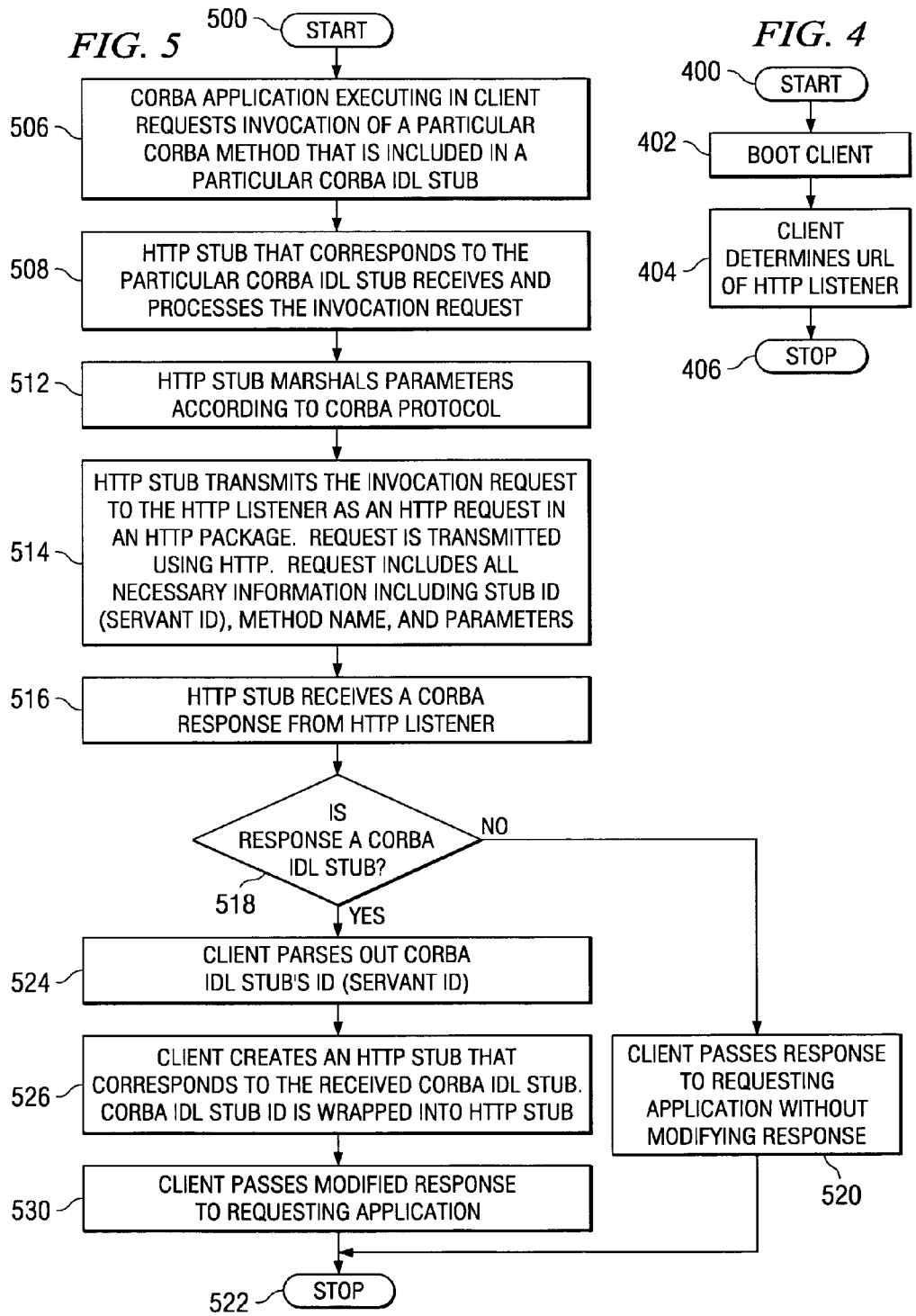

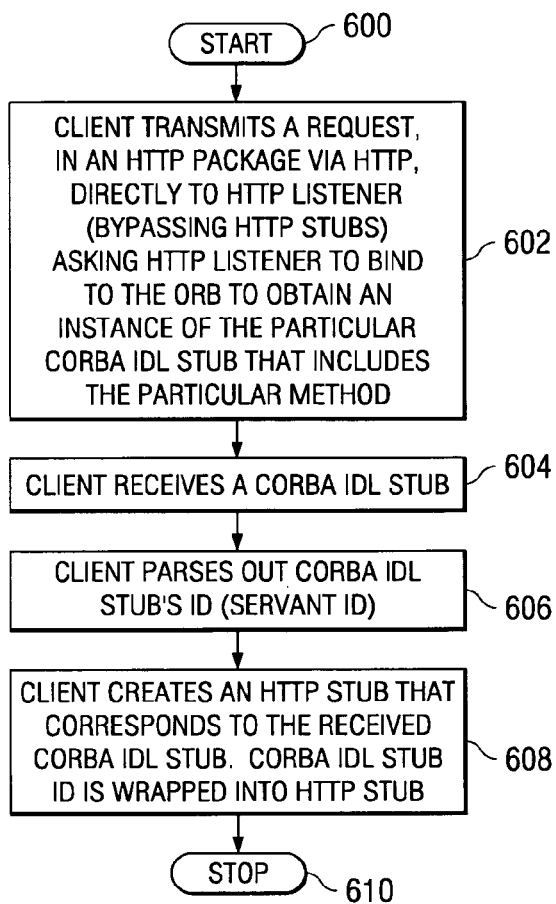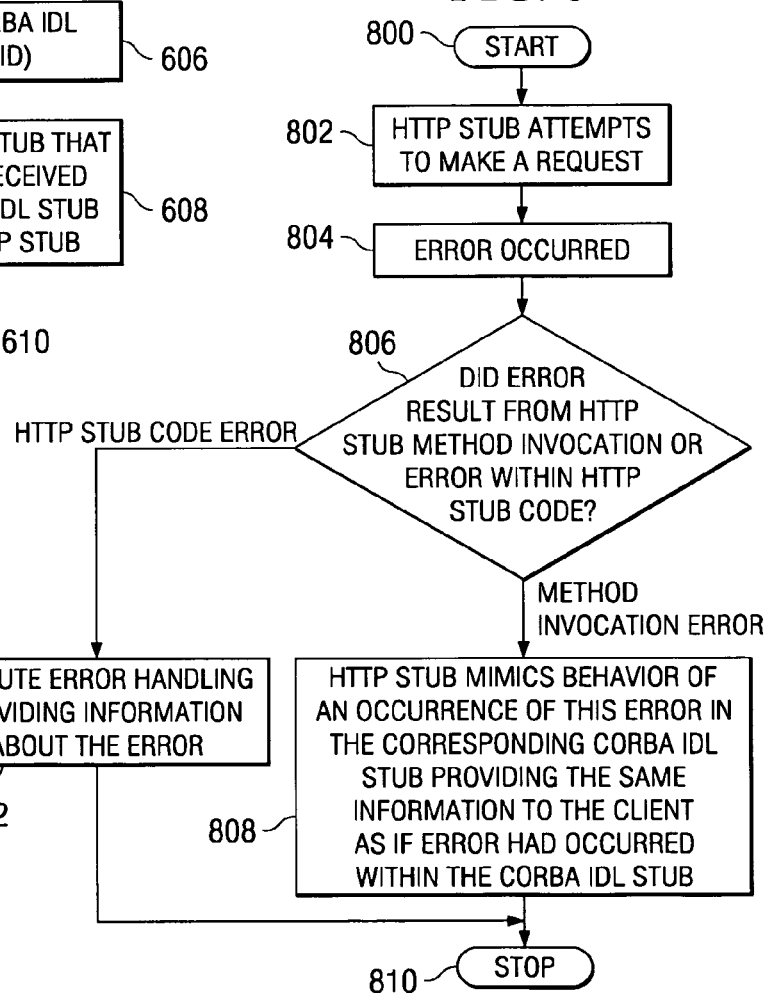

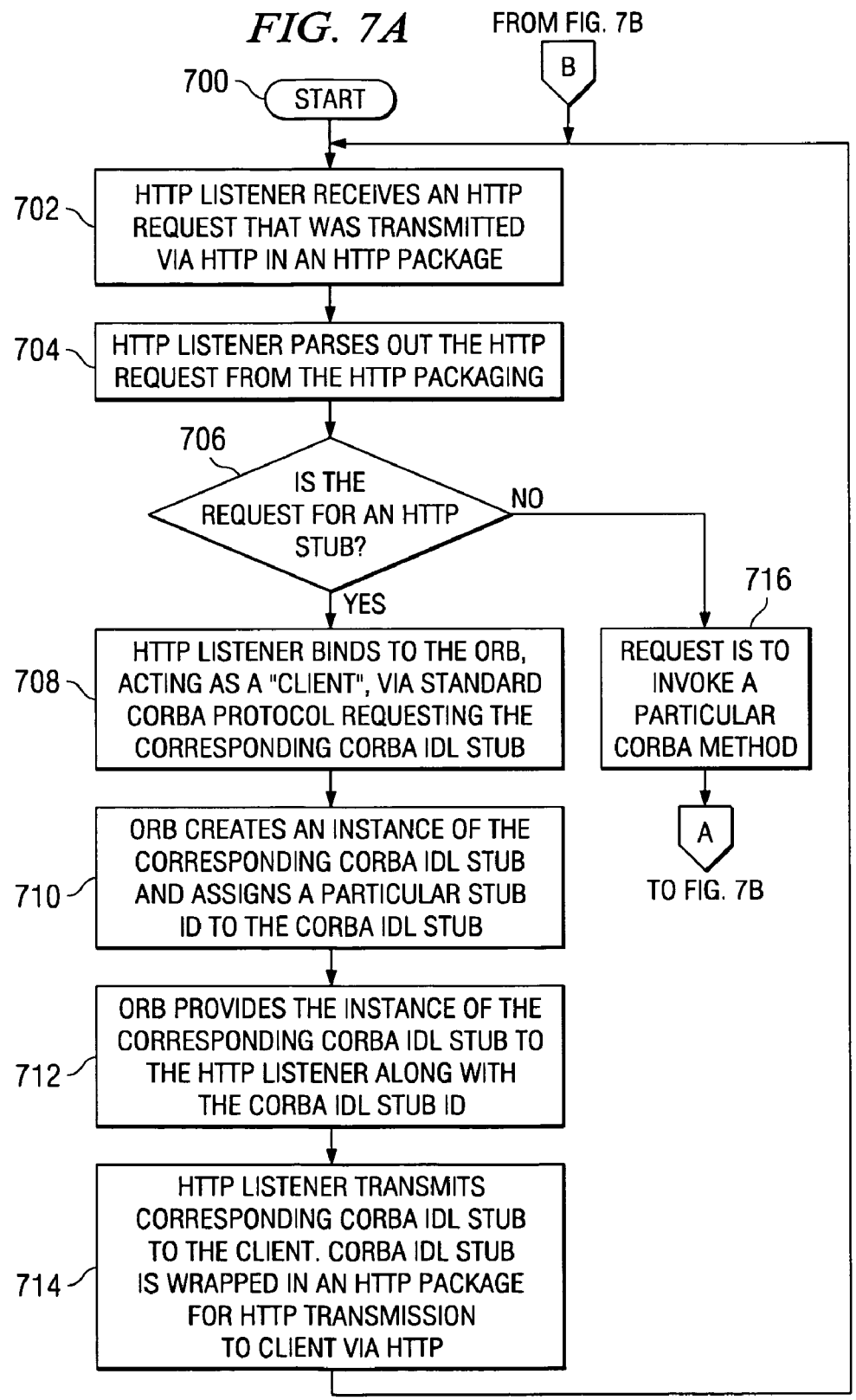

COMPUTER-IMPLEMENTED METHOD, APPARATUS, AND COMPUTER PROGRAM PRODUCT FOR TRANSMITTING INFORMATION BETWEEN CORBA APPLICATIONS AND SERVERS UTILIZING HTTP

BACKGROUND OF THE INVENTION

1. Field of the Invention

The present invention relates generally to data processing systems and more particularly to a computer-implemented method, apparatus, and computer program product for transmitting information between a Common Object Request Broker Architecture (CORBA) application and a server utilizing Hypertext Transfer Protocol (HTTP).

2. Description of the Related Art

The Common Object Request Broker Architecture (CORBA) is a vendor-independent infrastructure and architecture that is designed for network applications with distributed objects. It automates many common network programming tasks such as object registration, location, and activation, making it simple for clients to make object method invocations on a server. The communication protocol used by CORBA is the Internet Inter-ORB Protocol (IIOP).

FIG. 1 is a block diagram of a data processing environment 100 that includes a server 102 and a client 104 that communicate with each other using IIOP in accordance with the prior art. Applications that are executing within client 104 can invoke methods, which will ultimately be executed on server 102, through Interface Definition Language (IDL) stubs 106 that are provided to client 104 by ORB 108. CORBA IDL stubs 106 are CORBA stubs that are generated by ORB 108. CORBA IDL stubs 106 adhere to the CORBA standard.

A stub defines which methods are available to be invoked through that stub by including method signatures for methods that are available to be invoked through the stub. A method signature includes the method name and the parameters that it takes. In addition, the stub also has information about what type of exception/error the method will raise if necessary. Each method has a unique name that can be called by an application that is executing within the client. When an application wants to invoke a particular method, the application will call the method using the method's unique name. The stub that includes that method then invokes the method in server 102 which executes the method.

The stub is also responsible for transferring information to and from server 102 for client 104. The stub is connected to ORB 108 such that invoking the method through the stub causes ORB 108 to forward the invocation to ORB 110. ORB 110 then uses IDL skeleton 112 to decode the method call into a local method call into server 102.

ORBs 108 and 110 communicate with each other using a communication link 113 that implements Internet Inter-ORB Protocol (IIOP).

CORBA cannot communicate through firewalls directly using IIOP, as depicted by FIG. 2. This is one of CORBA's major weaknesses. FIG. 2 is a block diagram of data processing environment 100 that includes a firewall 114 that prevents server 102 and client 104 from communicating with each other using IIOP in accordance with the prior art.

There exists a number of methods to permit IIOP packets to be transmitted through a firewall, but all methods suffer from some significant disadvantage. One solution is to create a custom proxy server that allows IIOP packets to go through the firewall. Developing such a proxy server is time consuming.

Another solution is to sacrifice security and open up a hole in the firewall, but not many are willing to do so.

Therefore, a need exists for a method, apparatus, and computer program product for permitting existing CORBA applications to have an HTTP tunneling ability, such as through firewalls, without requiring modification of the CORBA applications or a significant change in the other code.

SUMMARY OF THE INVENTION

A computer-implemented method, apparatus, and computer program product in a data processing environment are disclosed for transmitting information utilizing HTTP between a CORBA application executing within a client and a server. An application that is being executed by a client requests a CORBA IDL stub to invoke a CORBA method. The CORBA IDL stub transmits requests to a server utilizing Internet Inter-ORB Protocol (IIOP). An HTTP stub is generated that transmits requests utilizing HTTP instead of IIOP. The HTTP stub corresponds to the CORBA IDL stub such that the CORBA IDL stub and the HTTP stub define the same methods that can be invoked utilizing the same method signatures. The HTTP stub transmits the request of the CORBA IDL stub to invoke the CORBA method to the server utilizing HTTP.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a high level flow chart that illustrates a client providing an address of an HTTP listener to the client's HTTP stubs in accordance with an illustrative embodiment of the present invention;

FIG. 5 illustrates a high level flow chart that depicts an application that is executing in the client invoking a method utilizing an HTTP stub in accordance with an illustrative embodiment of the present invention;

FIG. 6 illustrates a high level flow chart that depicts an application that is executing in the client requesting an HTTP stub in accordance with an illustrative embodiment of the present invention;

FIGS. 7A and 7B illustrate a high level flow chart that depicts an HTTP listener processing requests in accordance with an illustrative embodiment of the present invention;

FIG. 8 depicts a high level flow chart that illustrates error processing in accordance with an illustrative embodiment of the present invention.

DETAILED DESCRIPTION OF THE PREFERRED EMBODIMENT

Figure 3:
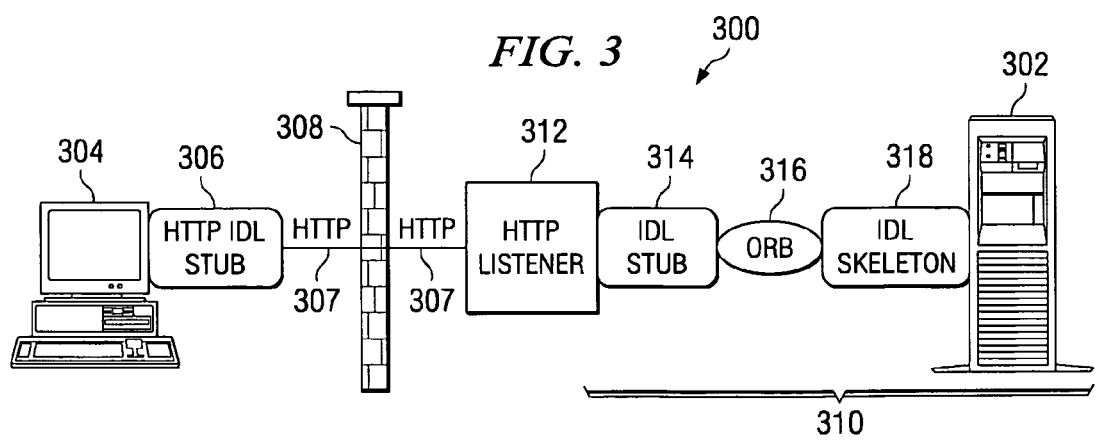
FIG. 3 is a block diagram of a data processing environment that includes a server and a client in accordance with an illustrative embodiment of the present invention.

FIG. 3 is a block diagram of a data processing environment 300 that includes a server 302 and a client 304 in accordance with an illustrative embodiment of the present invention. Applications that are executing within client 304 can invoke methods, which will ultimately be executed on server 302, using HTTP stubs 306. HTTP stubs 306 do not conform to the CORBA standard and are not provided by an ORB.

According to the prior art, CORBA IDL stubs 106 are provided to client 104. According to an illustrative embodiment of the present invention, HTTP stubs 306 are provided to client 304 instead of CORBA IDL stubs 106.

A stub is responsible for transferring, for the client, information to and from the server. A method in a stub is called by its method signatures. According to the illustrative embodiment of the present invention, all method signatures in the HTTP stubs 306 are the same as they were in CORBA IDL stubs 106. Thus, a CORBA application that was written to call particular CORBA method signatures to invoke particular CORBA methods through CORBA IDL stubs 106 would not need to be modified in order to invoke those same CORBA methods through HTTP stubs 306.

Client 304 communicates with server 302 using communication links 307 that implement HTTP instead of IIOP. Thus, HTTP stubs 306 transmits and receives HTTP packets. These HTTP packets will contain all the information needed for method invocation as well as how the response should be sent back to the client. Because the method signatures used to invoke the methods in the HTTP stubs and CORBA IDL stubs are the same, no change to application code is necessary in order for client 304 to use HTTP stubs 306.

The HTTP packets sent out by HTTP stubs 306 are able to go through firewalls such as firewall 308, thus achieving firewall tunneling. In this manner, HTTP packets are transmitted from HTTP stub 306, through firewall 308, and received by a server environment 310.

Server environment 310 includes server 302, HTTP listener 312, CORBA IDL stubs 314, ORB 316, and IDL skeleton 318. The HTTP packets transmitted from HTTP stubs 306 will contain the necessary information for the HTTP Listener 312 to invoke the intended methods on server 302 using the normal CORBA invocation through original CORBA IDL stubs 314, ORB 316, and IDL skeleton 318.

CORBA IDL stubs 314 is the same as, performs the same function as, and can be implemented using CORBA IDL stubs 106. ORB 316 is the same as and performs the same function as the combination of ORB 108, IIOP 112, and ORB 110. IDL skeleton 318 is the same as and performs the same function as IDL skeleton 112.

HTTP listener 312 receives packets from HTTP stub 306. These packets include a request. The request will be a request to invoke a CORBA method as well as all of information that is necessary for HTTP listener 312 to invoke the method. For example, this information may include marshaled parameters that are needed by the server when executing a method. After HTTP listener 312 receives a packet, it parses out the request from the rest of the HTTP packaging.

HTTP Listener 312 acts as a typical CORBA client when it makes the invocations. Server 302 is indifferent to the substitution of HTTP listener 312 for client 304 as the original invoker of a method, since all server 304 sees is the invocation of intended methods. Server 304 then sends the results back to HTTP listener 312. Therefore, there is no code change necessary for the server 302 when implementing the illustrative embodiment of the present invention.

According to an illustrative embodiment, client 304 no longer communicates through the CORBA generated CORBA IDL stubs 106 but instead uses HTTP stubs 306. Furthermore, client 304 does not use the ORB at all. The HTTP stubs 306 will directly send out object invocation requests in HTTP instead of IIOP, thus allowing the requests to pass through firewall 308.

HTTP Listener 312 listens for HTTP requests from client 304 and uses CORBA IDL stubs 314, which conform to the CORBA standard, to communicate with the server 302. HTTP Listener 312 serves as an intermediary between the client 304 and server 302, thus allowing the communication protocol used by client 304 to be changed from IIOP to HTTP.

Server environment 310 contains a typical CORBA client/server pair: the HTTP Listener 312 acting like a client and communicating with server 302 using CORBA generated CORBA IDL stubs 314 and the ORB 316.

Client 304 will use HTTP stubs 306 to achieve CORBA method invocations through HTTP. HTTP Stubs 306 will include all the methods of its CORBA counterparts, but will instead send out information via HTTP instead of IIOP. The invokers of these methods will not know the difference between HTTP stubs and its CORBA counterparts, since the stub's layer of abstraction hides the communication protocol detail.

HTTP stubs 306 are created based on the corresponding CORBA generated CORBA IDL Stubs 106. Below is an example of a Java class declaration of a CORBA IDL Stub 106 implementation:

public class_IExampleStub
    extends org.omg.CORBA__2__3.portable.ObjectImpl
    implements IdlStubs.IExampleStub
    "IExampleStub" is the CORBA IDL Stub's class name
    "org.omg.CORBA__2__3.portable.ObjectImpl" is a vendor-specific CORBA's object implementation. This is the super class of all CORBA stubs, which defines the basic underlying functionality of every stub.
    IdlStubs.IExampleStub is the interface for this particular stub. It defines the specific stub's method signatures.

The class declaration of the corresponding HTTP Stub will be very similar to its CORBA counterpart. The following is the Java example of the corresponding HTTP stub's 306 version of the _IExampleStub:

public class_IExampleStub
    extends HttpStub
    implements IdlStubs.IExampleStub The key difference between the HTTP version of the Stub's class definition and the corresponding CORBA version is just the "extends" parameter. The HTTP stub replaced "org.omg.CORBA__2__3.portable.ObjectImpl" with "HttpStub". The "HttpStub" serves the same purpose as "org.omg.CORBA__2__3.portable.ObjectImpl": it defines the basic underlying functionality of each stub, such as "_invoke( )". It is within "HttpStub" that the original functionality of a CORBA stub is replaced with HTTP functionality.

Figure 1:
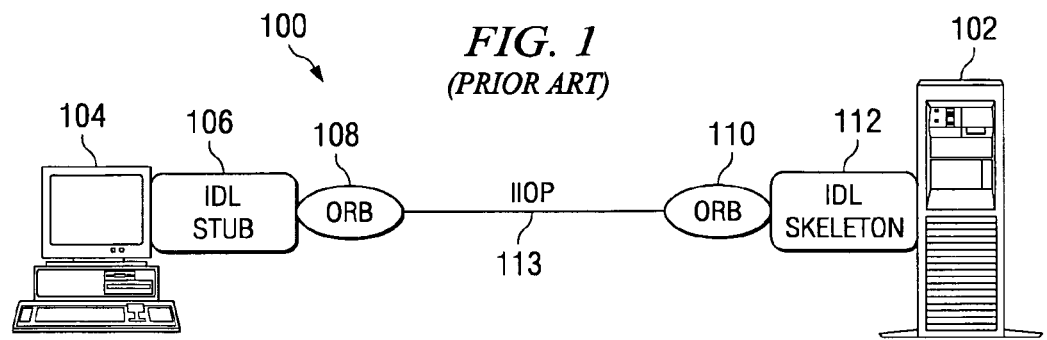
FIG. 1 is a block diagram of a server and a client that communicate with each other using Internet Inter-ORB Protocol (IIOP) in accordance with the prior art.
Figure 2:
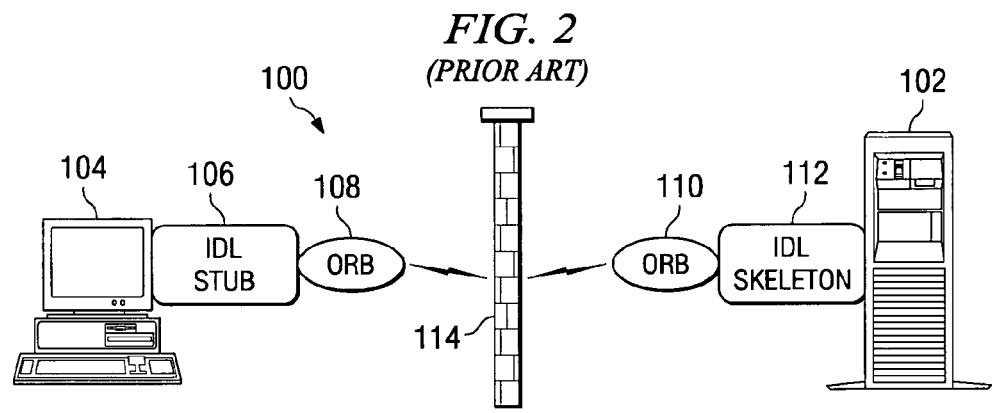
FIG. 2 is a block diagram of the data processing environment of FIG. 1 that includes a firewall that prevents the server and the client from communicating with each other using Internet Inter-ORB Protocol (IIOP) in accordance with the prior art.

When a method is to be invoked by an application, the stub that includes that method must first be obtained by the client. According to the prior art, referring to FIG. 1, client 104 obtains a CORBA IDL stub by binding to ORB 108.

According to the different aspects of present invention, there is no longer an ORB on the client side of the communication link. Therefore, client 304 will need to issue a request to HTTP Listener 312 to obtain the HTTP Stub. This request tells HTTP Listener 312 to bind to the ORB, ORB 316 in the depicted example, and send the resulting stub back. In this case, the resulting stub will be sent back to HTTP listener 312.

The stub obtained from the ORB is a CORBA IDL stub. HTTP listener 312 will receive the CORBA IDL stub and send it back to client 306 wrapped in HTTP packets using HTTP. Because client uses HTTP stubs instead of CORBA IDL stubs, the CORBA IDL stub received by client 304 will need to be transformed into an HTTP Stub. This could be achieved by instantiating an instance of the HTTP counter part of the CORBA IDL Stub.

When a CORBA IDL stub is returned by HTTP listener 312, a servant ID is included as part of the response. The servant ID is the CORBA IDL stub's identifier. This servant ID will be included in all method invocation requests sent by the corresponding HTTP Stub when invoking its methods. The servant ID is used by HTTP Listener 312 to identify the intended servant whose method is to be invoked.

HTTP stubs 306 generates requests that identify a method that is to be invoked. The request will contain all the necessary information needed by HTTP Listener 312 in order to invoke the intended method. When HTTP Listener 312 receives a request, HTTP listener 312 parses the HTTP message that includes the request to obtain the invocation request data and the invocation logic.

HTTP Listener 312 performs the following steps to complete a request: (1) listen for incoming HTTP requests, (2) parse out the HTTP request information from the HTTP packaging. The HTTP request object will contain all the information and instruction needed to perform the specific task. Thus, HTTP Listener 312 will only need to invoke the instruction, (3) if the request is for an HTTP stub, then the request will contain the logic requesting HTTP listener 312 to bind to the ORB and obtain the particular HTTP stub, (4) if the request is a method invocation request, then the logic will first retrieve the servant associated with the HTTP Stub that issued the request. This is achieved by using the servant ID sent along with the HTTP request. The servant will then execute the intended method, (5) Construct and send an HTTP response back to the client, (6) If the operation was successful, then whatever object returned by the invocation would be encapsulated in the HTTP response and returned to the client, regardless of the object's type. Therefore, if the object is a CORBA stub, it will be returned to the client as a CORBA stub. Upon receiving the response, the Client will transform any CORBA stub into HTTP stub, (7) if an error occurred during the invocation, then an HTTP response with an error code is returned to the client. The body of the HTTP response contains information about what kind of exception was occurred. This exception thus would be passed back to the client.

FIG. 4 depicts a high level flow chart that illustrates a client providing an address of an HTTP listener to the client's HTTP stubs in accordance with an illustrative embodiment of the present invention. The process starts as depicted by block 400 and thereafter passes to block 402 which illustrates booting the client. Next, block 404 depicts the client determining the URL of the HTTP listener. A common practice is to write the URL into a configuration file for the client to read. This URL address is then available to an HTTP stub when that HTTP needs to communicate with the HTTP listener. The process then terminates as depicted by block 406.

FIG. 5 illustrates a high level flow chart that depicts an application that is executing within the client invoking a method utilizing an HTTP stub in accordance with an illustrative embodiment of the present invention. The process starts as depicted by block 500 and thereafter passes to block 506 which illustrates a CORBA application that is executing within the client requesting invocation of a particular CORBA method that is provided by a particular CORBA IDL stub. This CORBA application was written to use the CORBA methods defined by CORBA IDL stubs 314. Therefore, the method signatures that are used by the application to invoke CORBA methods will be the CORBA method signatures that are defined by CORBA IDL stubs 314. According to an illustrative embodiment of the present invention, the same CORBA method signatures are used by HTTP stub 314. Therefore, the same signature is used by the application to invoke the particular method even though the method will be invoked through HTTP stub 314. Thereafter, block 508 depicts the HTTP stub that corresponds to the particular CORBA IDL stub receiving and processing the invocation request.

Block 512, then, depicts the HTTP stub marshalling parameters of this method according to the standard CORBA protocol. The process then passes to block 514 which illustrates the HTTP stub transmitting the invocation request to the HTTP listener as an HTTP request in an HTTP package. The request is transmitted from the HTTP stub to the HTTP listener using HTTP. The request includes all information that is necessary in order to execute the method, such as the stub ID (servant ID), the method's name, and the marshaled parameters. Block 516, then, depicts the HTTP stub receiving a CORBA response from the HTTP listener.

The process then passes to block 518 which illustrates a determination of whether or not the CORBA response is a CORBA IDL stub. If a determination is made that the response is not a CORBA IDL stub, the process passes to block 520 which depicts the client passing the CORBA response to the requesting application without modifying the CORBA response. Thereafter, the process terminates as illustrated by block 522.

Referring again to block 518, if a determination is made that the response is a CORBA IDL stub, the process passes to block 524 which depicts the client parsing out the CORBA IDL stub's ID (i.e. the servant ID). Thereafter, block 526 illustrates the client creating an HTTP stub that corresponds to the CORBA IDL stub just received. The CORBA IDL stub ID is wrapped into the HTTP stub. The newly created HTTP stub corresponds to the CORBA IDL stub just received in that both the HTTP stub and the CORBA IDL stub include the same method signatures. These method signatures can be used to invoke the same methods through the HTTP stub or the CORBA IDL stub. Next, block 530 depicts the client passing the modified response to the requesting application. The process then terminates as illustrated by block 522.

FIG. 6 illustrates a high level flow chart that depicts an application that is executing in the client requesting an HTTP stub in accordance with an illustrative embodiment of the present invention. The process starts as depicted by block 600 and thereafter passes to block 602 which illustrates the client transmitting a request, in an HTTP package via HTTP, directly to the HTTP listener, bypassing the HTTP stub, which asks the HTTP listener to bind to the ORB to obtain an instance of the CORBA IDL stub that includes the particular method. The request transmitted by the client, for example, may be an explicit API call or other explicit code.

Thereafter, block 604 illustrates the client receiving a CORBA IDL stub. Next, block 606 depicts the client parsing out the CORBA IDL stub's ID (servant ID). Block 608, then, illustrates the client creating an HTTP stub that corresponds to the received CORBA IDL stub. The CORBA IDL stub's ID is wrapped into the HTTP stub. The process then terminates as illustrated by block 610.

Figure 7B:
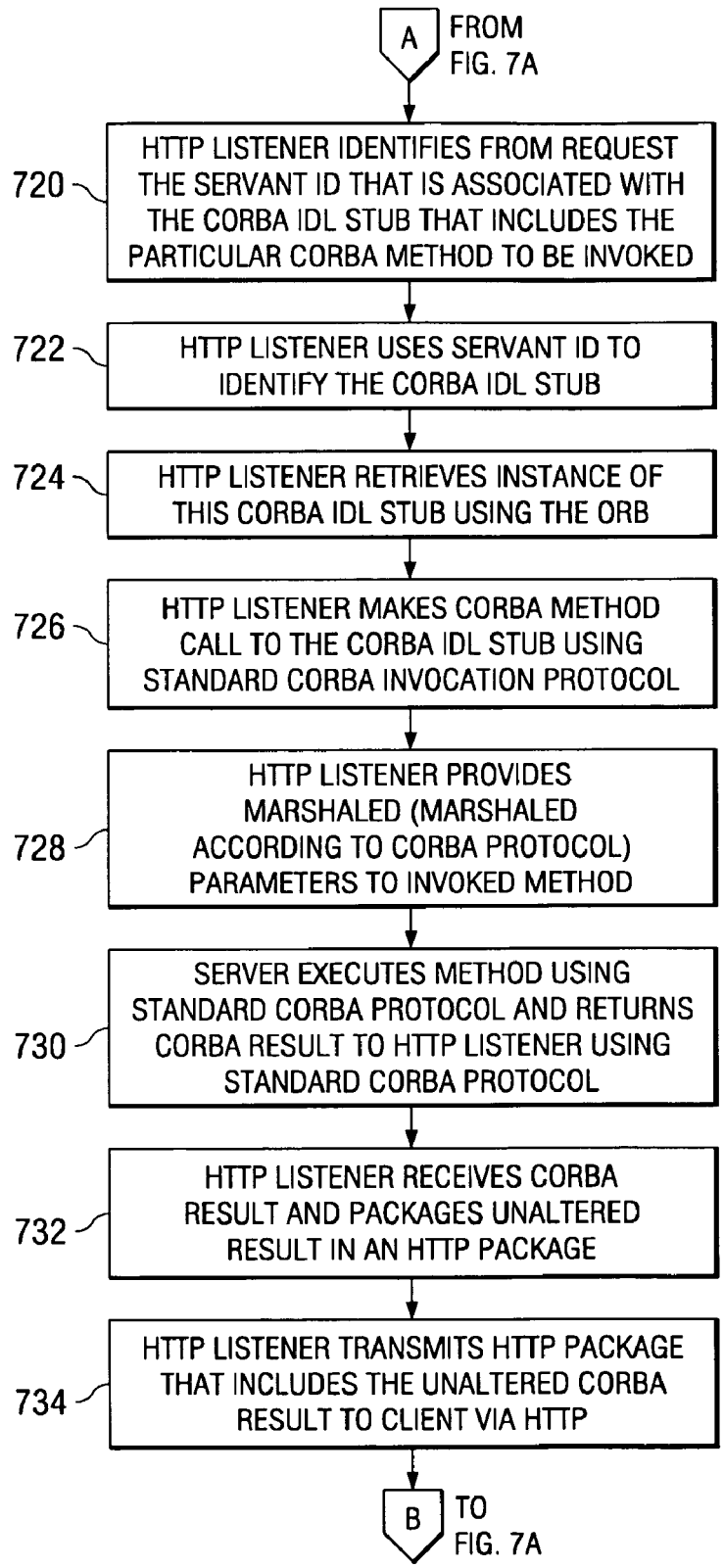

FIGS. 7A and 7B together illustrate a high level flow chart that depicts an HTTP listener processing requests in accordance with the illustrative embodiment of the present invention. The process starts as depicted by block 700 and thereafter passes to block 702 which illustrates the HTTP listener receiving an HTTP request in an HTTP package that was transmitted via HTTP. Next, block 704 depicts the HTTP listener parsing out the HTTP request from the HTTP packaging.

Block 706, then, illustrates the HTTP listener determining if the request is for an HTTP stub. If a determination is made that the request is for an HTTP stub, the process passes to block 708 which depicts the HTTP listener binding to the ORB via the standard CORBA protocol and requesting the corresponding CORBA IDL stub. When the HTTP listener binds to the ORB, the HTTP listener is acting as a traditional CORBA "client". The process then passes to block 710 which illustrates the ORB creating an instance of the corresponding CORBA IDL stub and assigning a particular stub ID (servant ID) to the CORBA IDL stub.

Thereafter, block 712 depicts the ORB providing the instance of the corresponding CORBA IDL stub to the HTTP listener along with the CORBA IDL stub ID. Block 714, then, illustrates the HTTP listener transmitting the corresponding CORBA IDL stub to the client. The CORBA IDL stub is wrapped in an HTTP package for HTTP transmission to the client via HTTP. The process then passes back to block 702.

Referring again to block 706, if a determination is made that the request is not a request for an HTTP stub, the process passes to block 716 which illustrates the request being a request to invoke a particular CORBA method. The process then passes to block 720, as illustrated through connector 7A. Block 720, then, depicts the HTTP listener identifying, from the request, the servant ID that is associated with the CORBA IDL stub that includes the CORBA method to be invoked.

The process then passes to block 722 which illustrates the HTTP listener using the servant ID to identify the CORBA IDL stub. Next, block 724 depicts the HTTP listener retrieving the instance of this CORBA IDL stub using the ORB. Thereafter, block 726 illustrates the HTTP listener making the method call to the CORBA IDL stub using the standard CORBA invocation protocol. Block 728, then, depicts the HTTP listener providing the marshaled parameters to the invoked method. These parameters were marshaled according to the standard CORBA protocol.

The process then passes to block 730 which illustrates the server executing the method using standard CORBA protocol and returning the CORBA result to the HTTP listener using the standard CORBA protocol. Block 732, then, depicts the HTTP listener receiving the CORBA result and packaging the result unaltered in an HTTP package. Thereafter, block 734 illustrates the HTTP listener transmitting the HTTP package that includes the unaltered CORBA result to the client via HTTP. The process then passes back to block 702 as depicted through connector 7B.

FIG. 8 depicts a high level flow chart that illustrates error processing in accordance with an illustrative embodiment of the present invention. The process starts as depicted by block 800 and thereafter passes to block 802 which illustrates the HTTP stub attempting to make a request. Next, block 804 depicts the occurrence of an error.

Block 806, then, illustrates a determination of whether or not the error was the result of an HTTP stub method invocation, i.e. during invocation of the server's method, or was an error within the HTTP stub code itself, i.e. the code written according to the illustrative embodiment of the present invention. If a determination is made that the error was the result of the invocation of method invocation, the process passes to block 808 which depicts the HTTP stub mimicking the behavior of an occurrence of this error in the corresponding CORBA IDL stub by providing the same information to the client as if the error had actually occurred within the CORBA IDL stub. The process then terminates as depicted by block 808.

Referring again to block 806, if a determination is made that the error was within the HTTP stub code, the process passes to block 812 which illustrates executing error handling and providing information about the error. The process then terminates as depicted by block 808.

Figure 9:
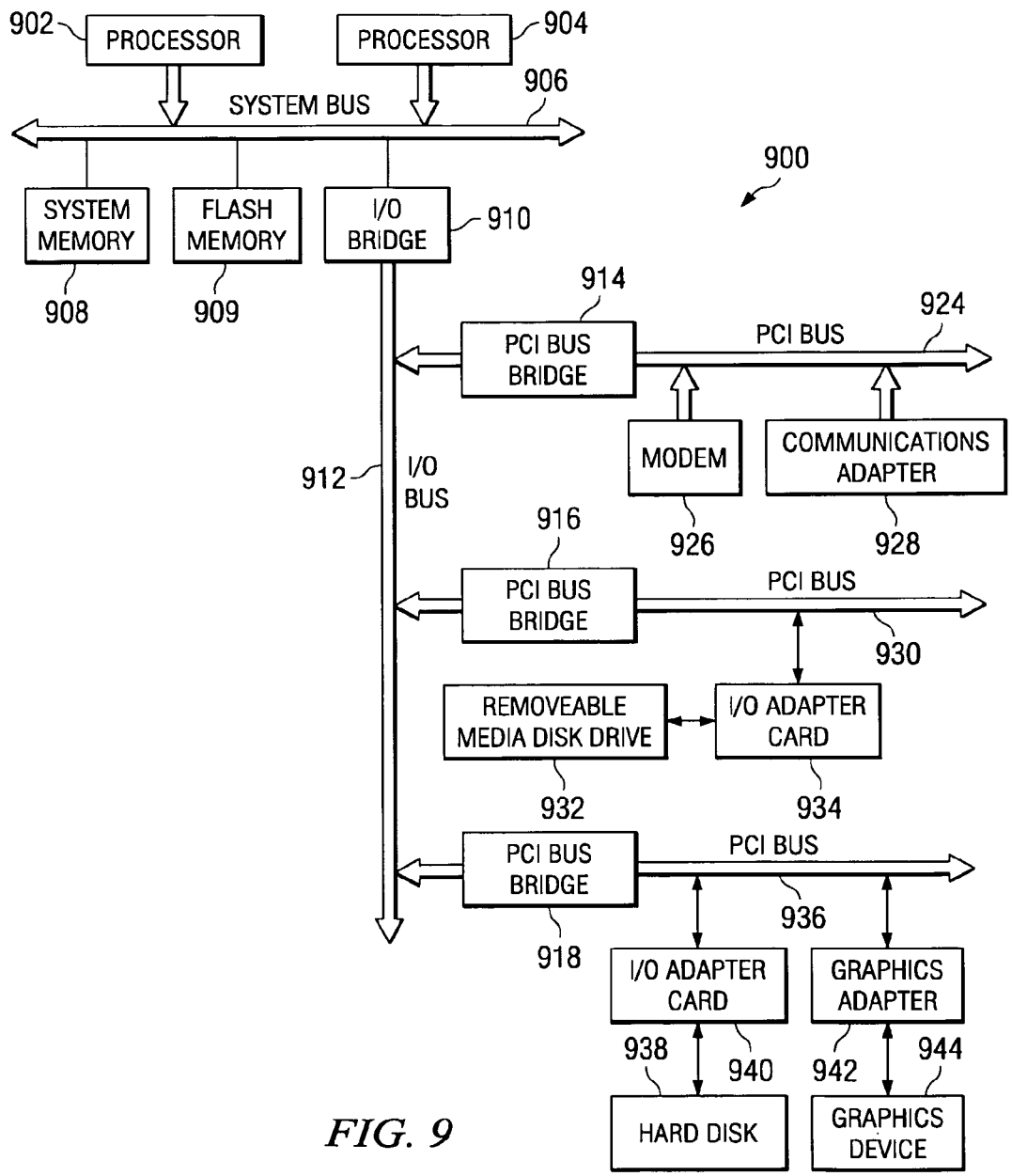
FIG. 9 is a block diagram of a computer system in which an illustrative embodiment of the present invention may be executed in accordance with an illustrative embodiment of the present invention.

FIG. 9 is a block diagram of a computer system in which the illustrative embodiment of the present invention may be executed in accordance with an illustrative embodiment of the present invention. For example, one computer system, as depicted by FIG. 9, may be provided in which client 304 is executed, while another computer system, as depicted by FIG. 9, may be provided in which server 302 is executed.

Computer system 900 may be a symmetric multiprocessor (SMP) system including a plurality of processors 902 and 904 connected to system bus 906. Alternatively, a single processor system may be employed. Also connected to system bus 906 is system memory 908 and flash memory 909. I/O bus bridge 910 is connected to system bus 906 and provides an interface to I/O bus 912.

System 900 includes PCI bus bridges 914, 916, and 918. Peripheral component interconnect (PCI) bus bridge 914 connected to I/O bus 912 provides an interface to PCI local bus 924. A number of modems may be connected to PCI bus 924. Typical PCI bus implementations will support four PCI expansion slots or add-in connectors. Communications links to other computers may be provided through modem 926 and communications adapter 928 connected to PCI local bus 924 through add-in boards. In this manner, data processing system 900 allows connections to multiple external network computers.

PCI bus bridge 916 is connected to PCI local bus 930. A storage device, such as a disk drive 932 capable of receiving removable media, is included in system 900. Removable media includes DVD-ROMs, CD-ROMs, floppy disk, tapes, and other media. Media disk drive 932 is coupled to PCI bus 930 via an I/O adapter card 934.

PCI bus bridge 918 is connected to PCI local bus 936. Another storage device, such as a hard disk drive 938, is included in system 900. Hard disk drive 938 is coupled to PCI bus 936 via an I/O adapter card 940. A memory-mapped graphics adapter 942 is also connected to I/O bus 936 as depicted. A graphics device 944, such as a display, is coupled to graphics adapter 942.

Those of ordinary skill in the art will appreciate that the hardware depicted in FIG. 8 may vary. For example, other peripheral devices, such as optical disk drives and the like, also may be used in addition to or in place of the hardware depicted. The depicted example is not meant to imply architectural limitations with respect to the illustrative embodiment.

The invention can take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method in a data processing environment for transmitting information utilizing a Hypertext Transfer Protocol (HTTP) between a Common Object Request Broker Architecture (CORBA) application and a server, said computer-implemented method comprising:
   requesting, by an application being executed by a processor in a client computer, an invocation of a CORBA method that is identified by one of a plurality of CORBA method signatures, and wherein a CORBA Interface Definition Language (IDL) stub includes the plurality of CORBA method signatures, and further wherein said CORBA IDL stub communicates using Internet Inter-ORB Protocol (IIOP), and still further wherein the CORBA method is executed on the server when the CORBA method is invoked;
   receiving, by an HTTP IDL stub, said request to invoke said CORBA method, wherein said HTTP IDL stub includes said plurality of CORBA method signatures, and wherein said HTTP IDL stub was created by said client computer using said CORBA IDL stub, and still further wherein said HTTP IDL stub communicates utilizing said HTTP;
   wherein said HTTP IDL stub defines methods that can be invoked through said HTTP IDL stub; and
   transmitting, by said HTTP IDL stub utilizing said HTTP, said request to have said CORBA method invoked;
   further comprising: receiving, by an HTTP listener, said transmitted request to have said CORBA method invoked;
   making, by said HTTP listener, a CORBA method call to said CORBA IDL stub; and
   invoking, by said CORBA IDL stub, said CORBA method in said server in response to said CORBA method call;
   wherein said CORBA IDL stub communicates with said server using Internet Inter-ORB Protocol (IIOP);
   wherein said HTTP IDL stub communicates with said HTTP listener through a firewall using HTTP.

2. The method according to claim 1, further comprising:
   executing, by said server, said CORBA method;
   generating, by said server, a CORBA response;
   transmitting, by said server utilizing IIOP, said CORBA response to said HTTP listener.

3. The method according to claim 2, further comprising:
   generating, by said HTTP listener, an HTTP package that includes said CORBA response;
   transmitting, by said HTTP listener utilizing said HTTP, said HTTP package to said HTTP IDL stub.

4. The method according to claim 1, further comprising:
   receiving, by said HTTP IDL stub, an HTTP package that includes a CORBA response to said request to have said CORBA method invoked;
   parsing, by said HTTP IDL stub, said HTTP package to obtain said CORBA response to said request; and
   sending said CORBA response to said CORBA application.

5. The method according to claim 1, further comprising:
   creating said HTTP IDL stub by transforming a class declaration of said CORBA IDL stub into a class declaration of said HTTP IDL stub, wherein a class name and implements parameter of said class declaration of said CORBA IDL stub are used as a class name and implements parameter for said class declaration of said HTTP IDL stub, respectively; and
   wherein said client computer modifies an extends parameter of said class declaration of said CORBA IDL stub to create a new extends parameter to be used in said class declaration of said HTTP IDL stub.

6. An apparatus in a data processing environment for transmitting information utilizing a Hypertext Transfer Protocol (HTTP) between a Common Object Request Broker Architecture (CORBA) application and the server, said apparatus comprising:
   a processor in a client computer executing an application that requests an invocation of a CORBA method that is identified by one of a plurality of CORBA method signatures, and wherein a CORBA Interface Definition Language (IDL) stub includes the plurality of CORBA method signatures, and further wherein said CORBA IDL stub communicates using Internet Inter-ORB Protocol (IIOP), and still further wherein the CORBA method is executed on a server when the CORBA method is invoked;
   said client computer creating an HTTP IDL stub using said CORBA IDL stub;
   said HTTP IDL stub receiving said request to invoke said CORBA method, wherein said HTTP IDL stub includes said plurality of CORBA method signatures, and still further wherein said HTTP IDL stub communicates utilizing said HTTP;

wherein said HTTP defines methods that can be invoked through said HTTP IDL stub; and said HTTP IDL stub utilizing said HTTP to transmit said request to have said CORBA method invoked;

further comprising: an HTTP listener receiving said transmitted request to have said CORBA method invoked;

said HTTP listener making a CORBA method call to said CORBA IDL stub; and said CORBA IDL stub invoking said CORBA method in said server in response to said CORBA method call;

wherein said CORBA IDL stub communicates with said server using Internet Inter-ORB Protocol (IIOP);

wherein said HTTP IDL stub communicates with said HTTP listener through a firewall using HTTP.

7. The apparatus according to claim 5, further comprising:
said server executing said CORBA method;
said server generating a CORBA response;
said server transmitting, utilizing IIOP, said CORBA response to said HTTP listener.

8. The apparatus according to claim 7, further comprising:
said HTTP listener generating an HTTP package that includes said CORBA response;
said HTTP listener transmitting, utilizing said HTTP, said HTTP package to said HTTP IDL stub.

9. The apparatus according to claim 5, further comprising:
said HTTP IDL stub receiving an HTTP package that includes a response to said request to have said CORBA method invoked;
said HTTP IDL stub parsing said HTTP package to obtain said CORBA response to said request to have said CORBA method invoked; and
said client computer sending said CORBA response to said CORBA application.

10. The apparatus according to claim 5, further comprising:
said client computer creating said HTTP IDL stub by transforming a class declaration of said CORBA IDL stub into a class declaration of said HTTP IDL stub, wherein a class name and implements parameter of said class declaration of said CORBA IDL stub are used as a class name and implements parameter for said class declaration of said HTTP IDL stub, respectively; and
wherein said client computer modifies an extends parameter of said class declaration of said CORBA IDL stub to create a new extends parameter to be used in said class declaration of said HTTP IDL stub.

11. A computer program product comprising:
a non-transitory computer usable medium including computer usable program code for transmitting information utilizing a Hypertext Transfer Protocol (HTTP) between a Common Object Request Broker Architecture (CORBA) application and a server, said computer program product including;
computer usable program code which requests, by an application being executed by a processor in a client computer, an invocation of a CORBA method that is identified by one of a plurality of CORBA method signatures, and wherein a CORBA Interface Definition Language (IDL) stub includes the plurality of CORBA method signatures, and further wherein said CORBA IDL stub communicates using Internet Inter-ORB Protocol (IIOP), and still further wherein the CORBA method is executed on the server when the CORBA method is invoked;
computer usable program code which receives, by an HTTP IDL stub, said request to invoke said CORBA method, wherein said HTTP IDL stub includes said plurality of CORBA method signatures, and wherein said HTTP IDL stub was created by said client computer using said CORBA IDL stub, and still further wherein said HTTP IDL stub communicates utilizing said HTTP;
wherein said HTTP defines methods that can be invoked through said HTTP IDL stub; and
computer usable program code which transmits, by said HTTP IDL stub utilizing said HTTP, said request to have said CORBA method invoked;
further comprising: computer usable program code which receives, by an HTTP listener, said transmitted request to have said CORBA method invoked;
computer usable program code which makes, by said HTTP listener, a CORBA method call to said CORBA IDL stub; and
computer usable program code which invokes, by said CORBA IDL stub, said CORBA method in said server in response to said CORBA method call;
wherein said CORBA IDL stub communicates with said server using Internet Inter-ORB Protocol (IIOP);
wherein said HTTP IDL stub communicates with said HTTP listener through a firewall using HTTP.

12. The computer program product according to claim 11, further comprising:
computer usable program code which executes, by said server, said CORBA method;
computer usable program code which generates, by said server, a CORBA response;
computer usable program code which transmits, by said server utilizing IIOP, said CORBA response to said HTTP listener.

13. The computer program product according to claim 12, further comprising:
computer usable program code which generates, by said HTTP listener, an HTTP package that includes said CORBA response;
computer usable program code which transmits, by said HTTP listener utilizing said HTTP, said HTTP package to said HTTP IDL stub.

14. The computer program product according to claim 11, further comprising:
computer usable program code which creates said HTTP IDL stub by transforming a class declaration of said CORBA IDL stub into a class declaration of said HTTP IDL stub, wherein a class name and implements parameter of said class declaration of said CORBA IDL stub are used as a class name and implements parameter for said class declaration of said HTTP IDL stub, respectively; and
wherein said client computer modifies an extends parameter of said class declaration of said CORBA IDL stub to create a new extends parameter to be used in said class declaration of said HTTP IDL stub.

\* \* \* \* \*